United States Patent [19]

Ting

[11] 4,176,503

[45] Dec. 4, 1979

[54] CONTROLLED RELEASE WALL STRUCTURE

[75] Inventor: Raymond M. L. Ting, Pittsburgh, Pa.

[73] Assignee: H. H. Robertson Company, Pittsburgh, Pa.

[21] Appl. No.: 874,536

[22] Filed: Feb. 2, 1978

Related U.S. Application Data

[63] Continuation-in-part of Ser. No. 828,922, Aug. 29, 1977, abandoned.

[51] Int. Cl.² .................................................. E04C 1/00
[52] U.S. Cl. .................................................. 52/1; 52/98; 52/232
[58] Field of Search .............. 52/1, 98, 99, 232, 309.9, 52/208

[56] References Cited

U.S. PATENT DOCUMENTS

| | | | |
|---|---|---|---|
| 697,914 | 4/1902 | Griffin | 52/98 |
| 1,133,006 | 3/1915 | Cappett | 52/631 |
| 2,358,143 | 9/1944 | Castor | 52/1 |
| 2,721,157 | 10/1955 | Martin | 52/208 |
| 2,771,110 | 11/1956 | Tack | 52/98 |
| 3,319,520 | 5/1967 | Stefano | 52/98 |
| 3,328,493 | 8/1967 | Vezmar | 52/1 |
| 3,731,449 | 5/1973 | Kephart | 52/631 |
| 3,998,016 | 12/1976 | Ting | 52/323 |
| 4,050,204 | 9/1972 | Scott | 52/98 |

Primary Examiner—Price C. Faw, Jr.
Assistant Examiner—H. E. Raduazo

Attorney, Agent, or Firm—Harry B. Keck

[57] ABSTRACT

A controlled release wall structure is provided which relies on controlled strength distribution and which disengages from a building framework at a selected applied load — failure load — and collapses in the direction of the applied load, that is, inwardly or outwardly of the building. Under normal wind load conditions, the present wall structure will safely sustain the expected elastic deflection and working stresses. However, under abnormally high loadings such as applied by explosion forces or by tornado and hurricane wind forces, the present wall structure collapses to create a substantial open area whereby a minimal loading is transmitted to the structural framework. The present wall structure protects the building framework from being overstressed during tornadoes or hurricanes; and also is capable of quickly relieving excessive pressures generated by an explosion within or without the building. The present wall structure includes at least one composite panel which spans the distance between at least first and second frame members, and which has one panel end releasably retained on the first frame member. According to this invention the composite panel is provided with a discontinuity in the region between the first and second frame members, which reduces the bending strength of the composite panel. The discontinuity extends parallel with and is spaced at a "selected distance" from a proximate edge of the first frame member. The "selected distance" determines the failure load of the wall structure.

27 Claims, 23 Drawing Figures

CONTROLLED RELEASE WALL STRUCTURE

CROSS-REFERENCES TO RELATED APPLICATIONS (IF ANY)

This is a continuation-in-part of copending application Ser. No. 828,922 filed Aug. 29, 1977, and assigned to the assignee of the present invention and now abandoned.

BACKGROUND OF THE INVENTION

1. Field of the Invention:

This invention relates to building wall structures, and more particularly to controlled release wall structures adapted to collapse inwardly or outwardly relative to the building framework when acted upon by abnormally high positive or negative wind pressures.

2. Description of the Prior Art:

In the past, building wall structures have been adapted to be separated from the structural framework — usually away from the framework — when the wall structure experiences a selected elevated pressure. Such elevated pressure may be created by explosions occurring within the confines of the building or by abnormally high negative wind pressures. Such wall structures have been provided wherein the panels.

(a) are held in place by resilient members, see, for example, U.S. Pat. Nos. 3,112,535; 3,150,749; 3,258,890;

(b) are secured to the frame members by releasable fastening means of the type which will fail in shear or in tension, see, for example, U.S. Pat. Nos. 3,258,887; 3,807,106; and (c) are secured to the structural framework by pressure release fasteners which incorporate a deformable metal washer which is forced over the fastener head during release of the panel, see, for example, U.S. Pat. No. 3,828,493.

In a recent development, a wall structure is provided which spans across at least two frame members and which is adapted to collapse (inwardly or outwardly) in the direction of and at a predetermined applied load. The wall structure includes a liner sheet having one end releasably retained to a first frame member, an outer facing sheet, and at least two subgirts disposed between and secured to the liner sheet and to the facing sheet. The failure load of the wall structure is controlled by the distance between the first frame member and the subgirt adjacent thereto. The failure load of the wall structure is regulated by controlling the force distribution in the wall structure components. See, for example, U.S. Pat. No. 3,998,016.

Transparent laminated window closures are known which, in response to excessive pressures, rupture or yield inwardly or outwardly from the original plane of the window. In one arrangement, one or both of the glass plates of the laminate may be split or scored along predetermined lines such that the closure ruptures into a selected number of segments, each segment having marginal edges hinged to the frame. See, for example, U.S. Pat. No. 2,679,467. In a second arrangement, the closure comprises triangular segments having a yieldable strip, such as elastic tape or the plastic interlayer of the laminate, which bridges across the adjacent edges of the segments. The yieldable tape flexes during application of excessive pressures, thereby allowing the triangular segments to move in the direction of the applied pressure. See, for example, U.S. Pat. No. 2,721,157.

SUMMARY OF THE INVENTION

The principal object of this invention is to provide a wall structure comprising at least one composite panel, which safely sustains the expected deflection and working stresses encountered under normal wind loadings but which is adapted to collapse at abnormally high loadings, such as produced during tornadoes or hurricanes and such as generated by explosions within or without the building.

Another object of this invention is to provide a controlled release wall structure which prevents overloading the building structural framework and hence the building structural framework need not be designed for full tornado and hurricane loads.

Another object of this invention is to provide a controlled release wall structure which is adapted to collapse at a specified applied load but which remains positively connected to the structural framework.

Another object of this invention is to provide a controlled release wall structure wherein the collapse of the wall structure at a predictable failure load relies on controlled strength distribution within the composite panel.

Still another object of this invention is to provide a controlled release wall structure incorporating a composite panel having a discontinuity extending substantially parallel with and spaced at a selected distance from an adjacent frame member, wherein the discontinuity reduces the bending strength of the composite panel in the plane of the discontinuity — the "selected distance" determining the failure load at which the composite panel will collapse.

The present invention provides a wall structure of the type incorporating at least one composite panel and having a blow-in/blow-out feature which protects the building structural framework from being overloaded when the wall structure experiences abnormally high wind loadings such as produced during tornadoes and hurricanes. The present wall structure may also operate to release excessive pressures, such as generated by an explosion within the interior of the building.

The present wall structure may be erected as a single-span or double-span structure. At a selected failure load, the wall structure fails in bending, disengages from one end support, and collapses inwardly or outwardly depending on the direction of the applied load. In its collapsed configuration, the wall structure transmits a minimal wind loading to the structural framework. Positive fasteners placed at one end of the panel in the case of a single-span condition or at the central support in the case of a double-span condition prevent the wall structure from becoming completely disengaged from the structural framework.

In a single-span condition, the present wall structure comprises a composite panel spanning the distance between first and second frame members. Confinement means releasably retain one panel end on the first frame member. Fastening means positively secure the panel to the second frame member. The composite panel comprises spaced-apart inner and outer skins which are secured in shear-transferring relation by means of a structural core, such as a foam core, a honeycomblike core or the equivalent. The composite panel incorporates a discontinuity in at least one surface of one skin along a line extending generally parallel with and spaced at a selected distance from a proximate edge of the first frame member. The discontinuity reduces the bending strength of the composite panel in the plane of the discontinuity whereby the wall structure is adapted to disengage from the confinement means at an applied load determined by the selected distance and to collapse in the direction of the applied load, but remain positively connected to the second frame member.

In a double-span structure, the composite panel is supported on three frame members, i.e., two end frame members and a central frame member. Two discontinuities are provided, one adjacent to each end of the composite panel.

Where the two spans are of equal length, the discontinuities are spaced at substantially identical selected distances from the proximate edges of the adjacent end frame members. The two equal spans will collapse at substantially identical selected failure loads.

Occasionally due to structural steel conditions, the two spans are of unequal length. In this instance, the discontinuities are spaced at different selected distances from the proximate edges of the adjacent end frame members. However the different selected distances are chosen such that the two unequal spans will collapse at substantially identical selected failure loads.

In accordance with this invention, the elastic properties of the wall structure, that is, the elastic deflection and the working stresses, are essentially the same as those of a conventional wall structure. Hence, the ability of the present wall structure to resist normal wind loadings is not significantly reduced despite the introduction of the discontinuity. While the bending strength of the panel in the plane of the discontinuity is reduced, the effects of the reduced bending strength are exhibited only under abnormally high loading conditions. That is, only after the composite panel fails by buckling or yielding at the maximum moment region and after the load is redistributed does the discontinuity trigger the release mechanism which forces collapse of the panel at the location of the discontinuity.

The present wall structure may also be erected as a single-span wall structure wherein the opposite ends thereof are slideably retained on the adjacent frame members. In accordance with this second embodiment, the composite panel is provided with at least one discontinuity extending generally parallel with and spaced at a selected distance from a proximate edge of a first frame member. The arrangement is such that the wall structure is adapted to disengage from the confinement means at an applied load determined by the selected distance and to collapse in the direction of the applied load.

DESCRIPTION OF THE PREFERRED EMBODIMENT(S)

Figure 1:
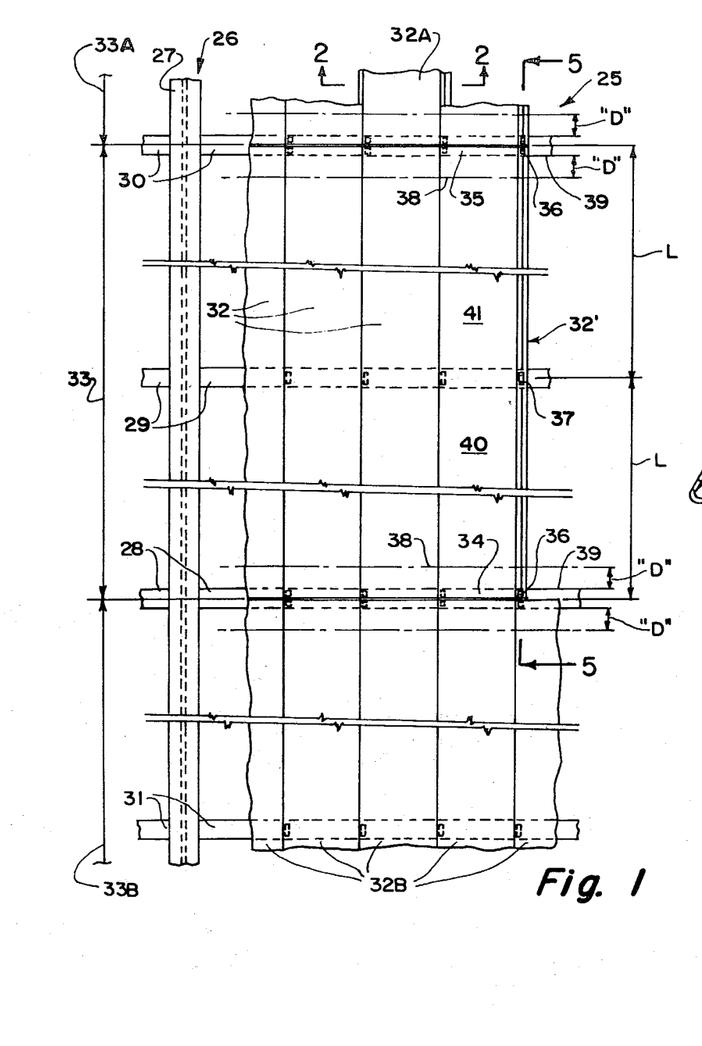
FIG. 1 is a fragmentary elevation view illustrating the controlled release wall structure of this invention erected on a structural framework of a building.

FIG. 1 illustrates a controlled release wall structure 25 of this invention erected on a structural framework 26 of which only a vertical column 27 and horizontal frame members or girts 28 through 31 are illustrated. The present wall structure 25 includes at least one and preferably a plurality of composite panels 32 erected in side-by-side lapped relation. The present wall structure 25 may be erected as a double-span wall section 33 wherein each of the composite panels, for example, the composite panel 32', has opposite or first and second panel ends 34, 35 lapping the first and third frame members 28, 30. Confinement means 36 is provided for releasably retaining each of the panel ends 34, 35 on the first and third frame members 28, 30. Fastening means 37 is provided for positively securing the composite panel 32' to the second or central frame member 29.

The composite panel 32' presents a first panel segment 40 spanning between the first and central frame members 28, 29; and a second panel segment 41 spanning between the central and third frame members 29, 30. The first and second panel segments 40, 41 have span lengths indicated by the dimension lines L.

In accordance with the present invention, the composite panels 32 have first and second discontinuities 65 (see FIG. 5), one positioned between the first and central frame members 28, 29 and the other positioned between the central and third frame members 29, 30, respectively. As will hereinafter be described, each of the discontinuities is formed in at least one surface of one skin along a line indicated by the dash-dot line 38 in FIG. 1, which extends generally parallel with and which is spaced at a selected distance "D" from a proximate or adjacent edge 39 of the first and third frame members 28, 30. The arrangement is such that each of the discontinuities reduces the bending strength of the composite panel segments 40, 41, whereby the wall structure is adapted to disengage from the confinement means 36 at an applied load determined by the selected distance "D" and to collapse in the direction of the applied load. During collapse the fastening means 37 maintains the composite panel 32 positively connected to the second or central frame member 29.

Preferably the span lengths L are substantially identical so that the applied load and the working stresses resulting therefrom are distributed substantially equally between the first and second panel segments 40, 41. In this instance the discontinuities 65 (FIG. 5) in the panel segments 40, 41 are provided at substantially identical selected distances "D". The equal length panel segments 40, 41 will collapse at a single selected failure load.

Occasionally the position of the horizontal frame members or girts 28 to 30 will be such that the span lengths L are unequal; and the applied load and the working stresses resulting therefrom will be distributed unevenly between the first and second panel segments 40, 41. Consequently the discontinuities 65 (FIG. 5) in the panel segments 40, 41 are provided at different selected distances "D" — the selected distance "D" for the shorter span being greater than the selected distance "D" of the longer span. It will be appreciated that the different selected distances "D" are chosen such that each of the two unequal spans will collapse at the same selected failure load.

It will also be observed in FIG. 1 that wall sections 33A and 33B, each comprising a plurality of the composite panels 32A, 32B, respectively, may be erected above and below the wall section 33. The wall sections 33A and 33B may be single-span or double-span wall sections.

COMPOSITE PANEL 32: The present controlled release wall structure incorporates panels of the type known as composite panels which comprise spaced-apart inner and outer skins which are secured in shear-transferring relation by means of a structural core. In general the strength of the skins is equal to or greater than that of the structural core. The skins sustain bending stresses whereas the core sustains shear stresses. The bonds between the core and each of the skins develop the shear-transfer mechanism.

Skins suitable for use in composite panels exhibit a modulus of elasticity of at least 500,000 psi, and tensile and compressive strengths of at least 1,000 psi. Suitable skins may be formed from metals such as sheet steel, aluminum and the like, wood including laminates such as plywood, glass fiber reinforced plastics, glass fiber reinforced gypsum, and fiber reinforced concrete.

Structural cores suitable for use in composite panels exhibit a shear modulus of at least 100 pounds per square inch and a shear strength of at least 10 pounds per square inch. Suitable core materials include foamed-in-place plastics, metal and paper honeycomb members and the like.

The bonds between the skins and the core must exhibit a bond strength of at least 10 pounds per square inch. Adequate bonds are formed between the skins and foamed-in-place plastic materials. Well-known structural adhesives such as an epoxy structural adhesive normally are employed to secure the honeycomb member to the inner and outer skins.

Figure 2:
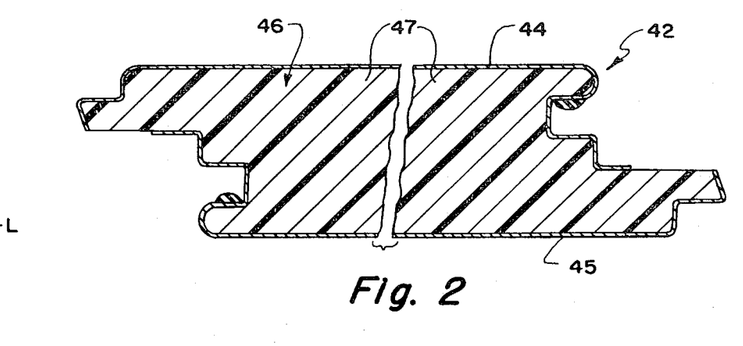
FIG. 2 is a cross-sectional view taken along the line 2—2 of FIG. 1, illustrating a composite panel having a foam core.
Figure 3:
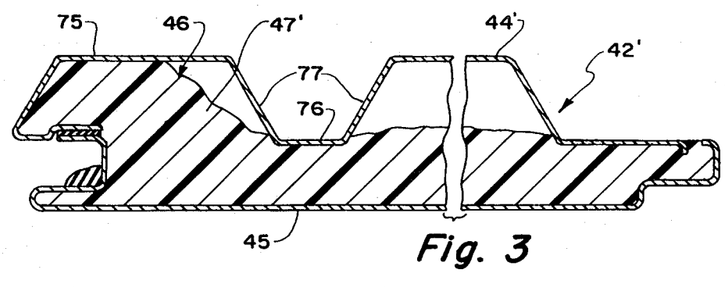
FIGS. 3 and 4 are cross-sectional views, similar to FIG. 2, illustrating other composite panels.
Figure 4:
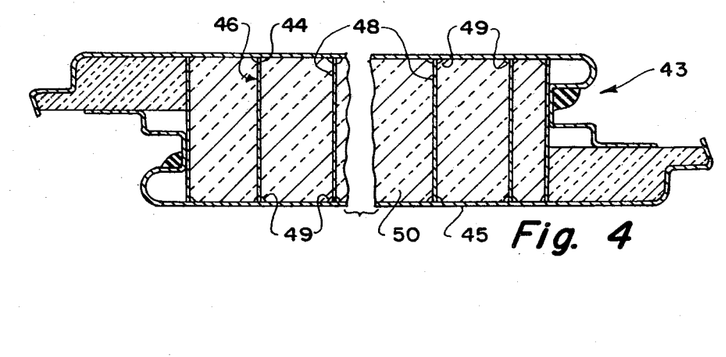

Typical composite panels 42, 42', and 43 are illustrated in FIGS. 2 to 4. The composite panel 42 (FIG. 2) may comprise substantially flat outer and inner skins 44, 45 and a structural core 46. The core 46 may comprise a foamed plastic core 47 of the foamed-in-place type which during expansion self-adheres to the skins 44, 45. Alternatively, the foamed plastic core 47 may be provided in the form of a slab which is profiled and secured to the skins 44, 45 by means of a structural adhesive, in the manner suggested in U.S. Pat. No. 3,555,756. For a complete description of the composite panel 42 attention is directed to U.S. Patent No. 3,777,430 which is incorporated herein by reference.

The composite panel 42' (FIG. 3) comprises a profiled outer skin 44', a substantially flat inner skin 45, and a structural core 46. The profiled outer skin 44' presents alternating crests 75 and valleys 76 connected by webs 77. The structure core 46 may comprise a foamed plastic core 47' which fills less than the entire space between the skins 44', 45. For a complete description of the composite panel 42' attention is directed to U.S. Pat. No. 3,849,959 which is incorporated herein by reference.

The composite panel 43 (FIG. 4) comprises substantially flat outer and inner skins 44, 45 and a structure core 46. The core 46 comprises a honeycomb-like core member 48 having its opposite faces secured to the skins 44, 45 by a structural adhesive 49. If desired, the cells of the core member 48 may be filled with a thermal insulation, e.g., expanded silicate such as perlite, foamed plastics material and the like. For a complete description of the composite panel 43 reference is directed to U.S. Pat. No. 3,998,023 and 3,998,024 which are incorporated herein by reference.

The outer skins 44, 44' and the inner skins 45 of the composite panels 42, 42' and 43 may, when formed from sheet metal, have a thickness in the range of 0.0179 to 0.0598 inches (0.45 to 1.52 mm).

Figure 5:
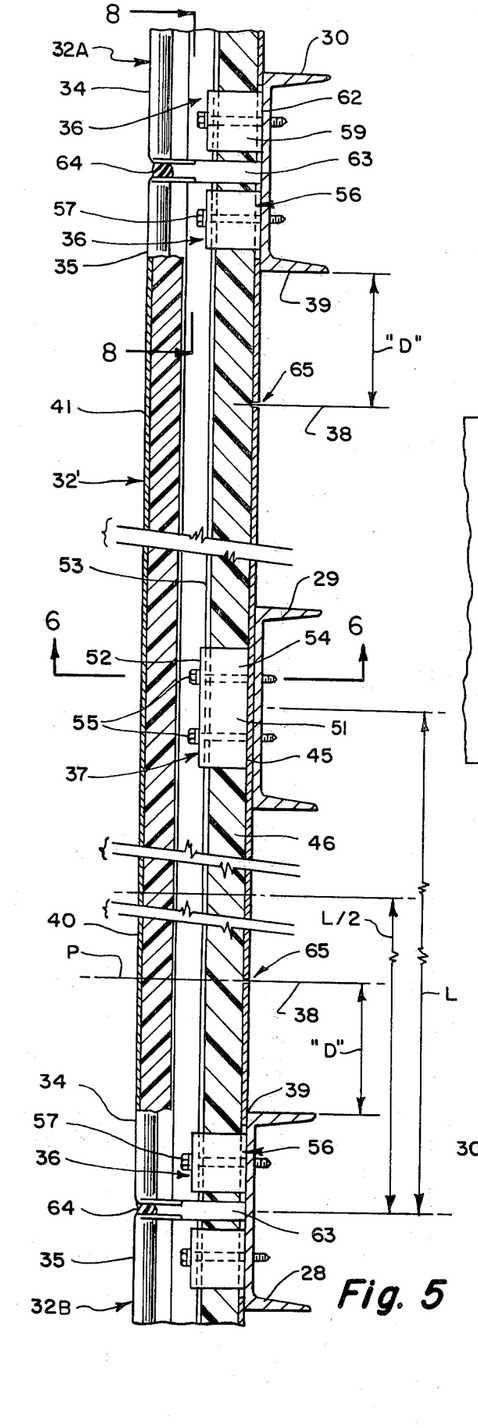
FIG. 5 is a broken cross-sectional view taken along the line 5—5 of FIG. 1.
Figure 6:
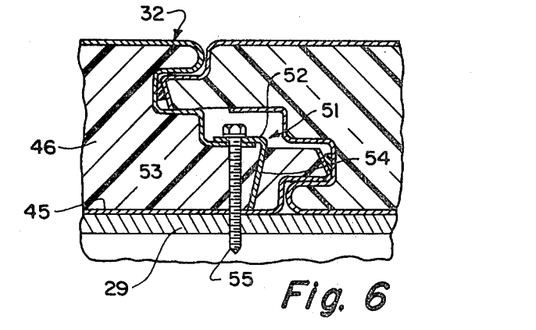
FIG. 6 is a fragmentary cross-sectional view taken along the line 6—6 of FIG. 1.
Figure 7:
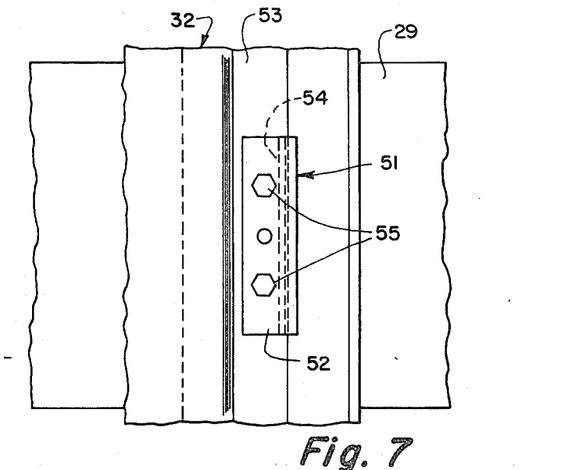
FIG. 7 is a plan view with one panel removed, illustrating the fastening means of FIG. 6.

FASTENING MEANS 37: Referring to FIGS. 5 through 7, the fastening means 37 may comprise an angle member 51 having a first leg 52 overlying a flange 53 of the composite panel 32; and a second leg 54 extending through the structural core 46 and having a remote end engaging the inner skin 45. Fasteners 55 extend through the first leg 52, the flange 53, the structural core 46, the inner skin 45 into threaded engagement with the central frame member 29. The clip members 51 and the fasteners 55 cooperate to positively secure the panel 32 to the central frame member 29.

Figure 8:
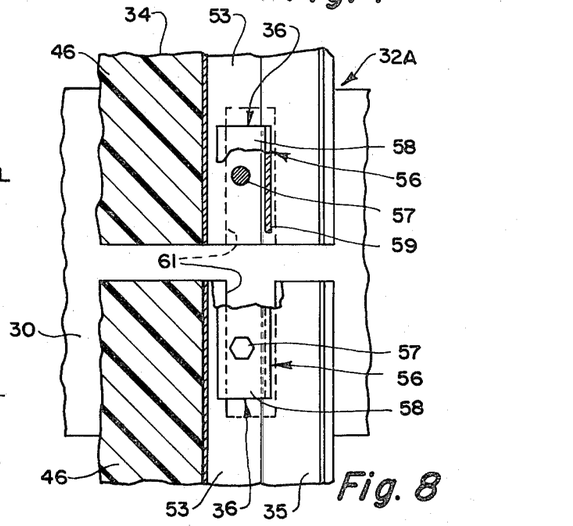
FIG. 8 is a fragmentary cross-sectional view taken along the line 8—8 of FIG. 5.

CONFINEMENT MEANS 36: In wall structures which incorporate composite panels of the type illustrated in FIGS. 2 and 3, individual confinement means 36 (FIGS. 5 and 8) may be provided for releasably retaining each of the panel ends 34, 35 to the first and third frame members 28, 30. Each of the confinement means 36 may comprise an angle member 56, similar to the angle member 51, and a cooperating fastener 57.

The angle member 56 has a first leg 58 overlying the flange 53 of the composite panel 32; and a second leg 59 extending through the structural core 46. The inner sheet 45 is provided with a slot 61 which exposes an upper surface of the frame member 30. As best shown in FIG. 5, the second leg 59 of the angle member 46 has a remote end 62 engaging the upper surface of the frame member 30. The confinement means 36 adequately retains the panels on the frame members when the wall structure is subjected to normal positive and negative wind loadings. However, during collapse the panel ends 34, 35 slide free of the confinement means 36. Since the fasteners 57 extend through the recesses 60 and the slots 61, no tearing or rupturing of metal is required as the panel ends slide free of the confinement means 36.

Figures 9, 10, 11:
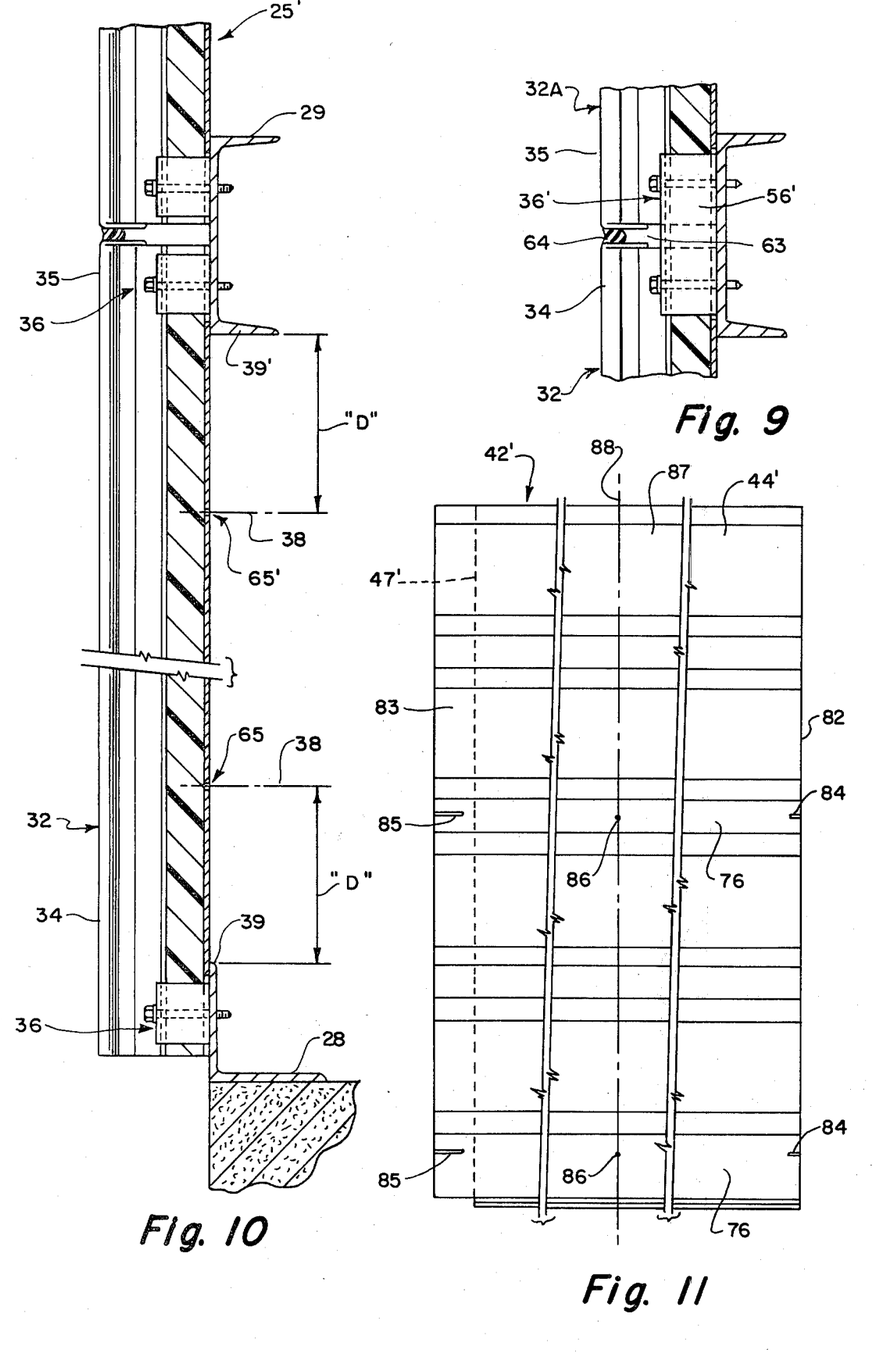
FIG. 9 is a cross-sectional view, taken in the plane of FIG. 5, illustrating alternative confinement means.
FIG. 10 is a broken cross-sectional view, similar to FIG. 5, illustrating another embodiment of this invention.
FIG. 11 is a broken plan view of the composite panel of FIG. 3 adapted for use in the present controlled release wall structure.

Alternatively, as shown in FIG. 9, confinement means 36' may be provided comprising a single angle member 56' which bridges the gap between the panel ends 34, 35 of the adjacent composite panels 32 and 32A.

It will be observed in FIGS. 5 and 9 that the panel ends 34, 35 of the panels 32 and 32A (and of the composite panels 32 and 32B) are spaced-apart and present a gap 63 therebetween. During erection, a suitable sealant 64 is introduced into the gap 63 to provide a vapor-tight seal.

Referring to FIG. 5, each of the panel ends 34, 35 is provided with a discontinuity identified generally by the numeral 65 which extends along the line 38.

An alternative embodiment of the present controlled release wall structure is illustrated in FIG. 10 and designated generally by the numeral 25'. In this embodiment, the composite panel 32 is erected on a single-span condition. Individual confinement means 36 releasably retain each of the panel ends 34, 35 to the first and second frame members 28, 29. In accordance with this embodiment, the composite panel 32 is provided with at least one discontinuity 65 which is spaced at a selected distance "D" from the proximate or adjacent edge 39 of the first frame member 28. If desired a second discontinuity 65' may be formed in the composite panel 32 along a second line 38' which is spaced at a selected distance "D" from the proximate or adjacent edge 39' of the second frame member 29. The overall arrangement is such that the composite panel 32 disengages from the confinement means at an applied load determined by the selected distance and collapses in the direction of the applied load. In the preferred arrangement, the selected distances "D" are substantially identical.

Figure 12:
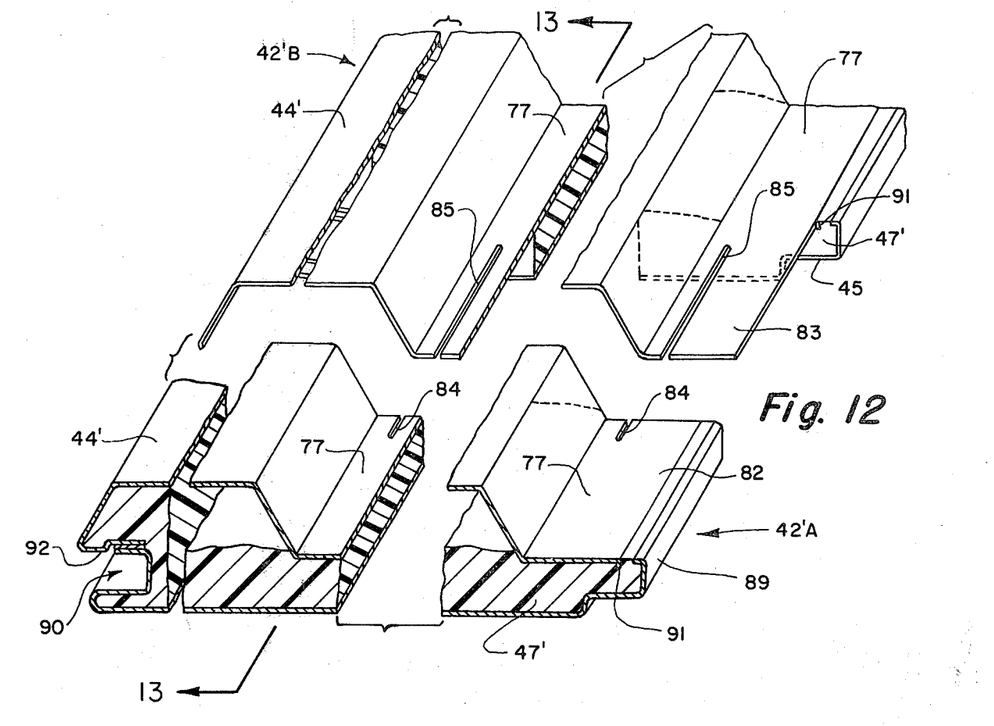
FIG. 12 is a fragmentary isometric view of adjacent ends of two of the composite panels of FIG. 11.
Figure 13:
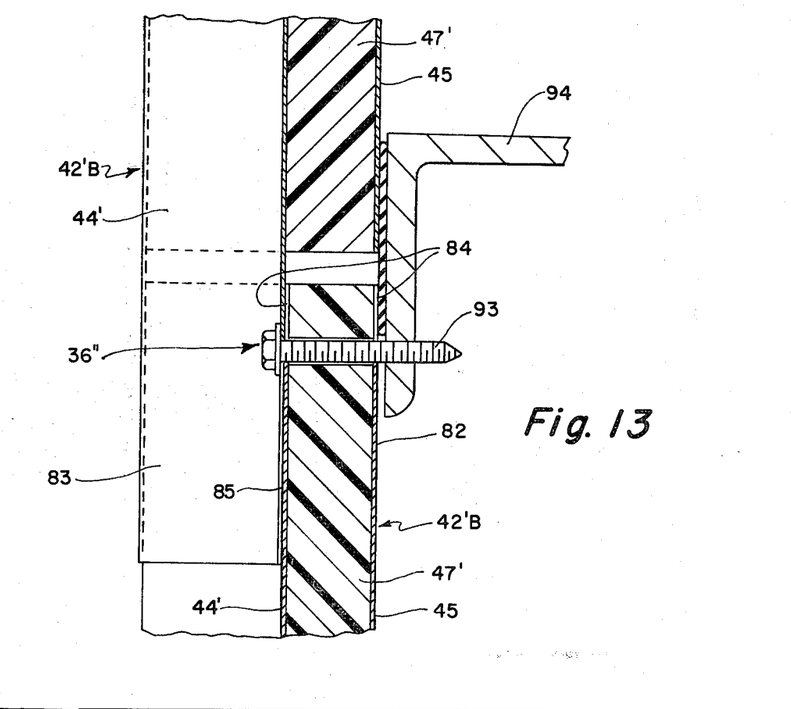
FIG. 13 is a cross-sectional view, taken along the line 13—13 of FIG. 12, illustrating releasably confined panel ends.

The opposite ends of the composite panel 42' of FIG. 3 may be adapted for use in the present controlled release wall structure in the manner illustrated in FIGS. 11 to 13. Slots 84 (FIG. 13) may be provided which extend longitudinally from the panel end 82 in the region of each of two spaced-apart valleys 76 of the outer skin 44'. The slots 84 may be formed prior to or after the panel 42' is assembled. If formed prior to assembly, the slots 84 are provided solely in the outer skin 44' and the inner skin 45 as shown in FIG. 13. If formed after assembly, the slots 84 may also extend through the core 47'. The opposite panel end 83 (FIGS. 11, 12) comprises an end segment of the outer skin 44' which extends beyond the core 47' and inner skin 45 and constitutes a lapping end. At least two additional slots 85 may be provided in the same valleys 76 at the opposite panel end 83. The slots 85 extend longitudinally from the terminal edge of the panel end 83. If the panel 42' (FIG. 11) is to be erected on a two-span condition, openings 86 are provided in the same valleys 76 and in a central portion 87 of the panel 42'. The openings 86 normally are drilled in the field and are adapted to receive fasteners (not illustrated) which positively secure the panel 42' to a central frame member represented by the dash-dot line 88.

It will be observed in FIG. 12 that the upper panel 42'A — also the subjacent panel 42'B — presents a tongue 89 and a complementary groove 90 along the opposite longitudinal edges thereof. In the region of the tongue 89, the valley 77 of the outer skin 44' presents a downturned flange 91 which penetrates the core 47'. The complementary groove 90 is defined in part by a laterally inwardly extending two-step flange 92.

It will further be observed in FIG. 12 that the downturned flange 91 and two-step flange 92 have been eliminated along the entire length of the panel end 83 of the upper panel 42'B. In the absence of the flanges 91, 92 the panel end 83 of the upper panel 42'B may be erected in overlapping relation with the panel end 82 of the subjacent panel 42'A as illustrated in FIG. 13.

As illustrated in FIG. 13, confinement means 36" in the form of a fastener 93 extending through the registered slots 84, 85 releasably retains the overlapped panel ends 82, 83 on a frame member 94. The frame member 94 corresponds to either the first or second frame member 28, 30 of FIGS. 1 and 5. It will be appreciated that as the panels 42'A, 42'B undergo bending buckling when subjected to the selected applied load, a dragging force is produced which pulls the panel ends 82, 83 free of the fastener 93. The resistance to release produced by the clamping force of the fastener 93 is insignificant compared to the magnitude of the aforesaid dragging force.

DISCONTINUITY: The collapse of the present controlled release wall structure at a predictable failure load is accomplished by controlling the strength distribution within each of the composite panels. As is known, the ultimate bending strength of a composite panel can be calculated and depends on the configuration of the panel and the strength properties of its components. The moment coefficient of the panel at mid-span establishes the load at which the panel will undergo bending failure. In accordance with this invention, a discontinuity is introduced which weakens, i.e., reduces the bending strength of the panel in a plane P (FIG. 5). The plane P extends transversely of and is generally perpendicular to the panel and also passes through the discontinuity. The moment coefficient of the panel in the plane P, that is, at the discontinuity, is less than the moment coefficient of the panel at mid-span. Thus a composite panel provided with an appropriately positioned discontinuity will fail at a predictable failure load or pressure threshold. Also, a composite panel of given configuration can be caused to fail predictably at any failure load within a range of failure loads by positioning the discontinuity at a preselected distance "D" (FIG. 5). The general relationship between the failure load of the present controlled release wall structure is discussed hereinafter in connection with FIG. 23.

Figure 14:
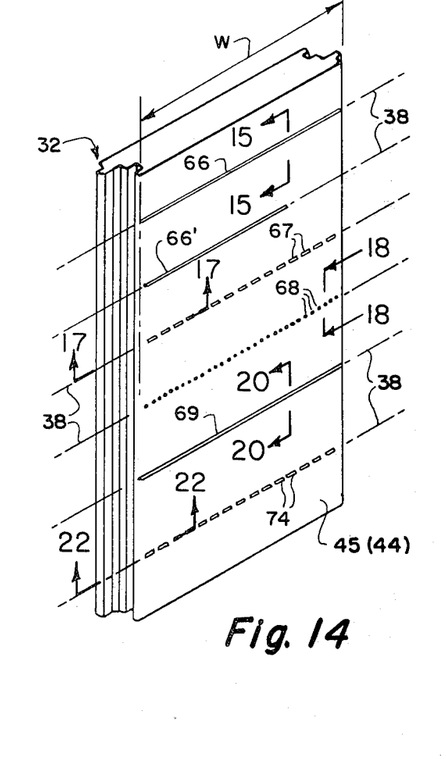
FIG. 14 is a fragmentary isometric view of a composite panel illustrating discontinuities of various forms.

FIG. 14 illustrates a composite panel 32 having a covering width W and which, for the purposes of illustration, is provided with discontinuities of various forms. It should also be appreciated that the discontinuity may be provided in either the inner skin 45 or the outer skin 44. Also, the discontinuity preferably is formed in the panel at the factory. Alternatively the discontinuity may be formed in the panel at the erection site.

Figure 15:
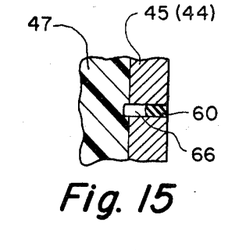
FIG. 15 is a cross-sectional view taken along the line 15—15 of FIG. 14.

The discontinuity 65 preferably comprises a cut 66 (FIGS. 14 and 15) such as made by a saw blade prior to assembling the panel 32 or such as made by an electric shear after the panel 32 has been assembled. The cut 66 preferably is formed in the skin 45(44) without penetrating the core 47 by more than ⅛ inch (3.2 mm). If desired, a sealant 60 or other suitable material may be introduced into the cut 66. Where the cut 66 is provided in the inner skin 45, the sealant 60 serves solely to conceal the cut 66. Where the cut 66 is provided in the outer skin 44, the sealant 60 not only conceals the cut 66 but also provides weather protection for the core 47.

As illustrated in FIG. 14, the cut 66 may extend substantially entirely across the full covering width W of the composite panel 32. Alternatively, the cut 66' may have a length which is less than the full covering width W. It has been determined that the positive and negative failure loads of the present composite panel are not only a function of the selected distance "D" but also are a function of the length of the cut 66. For example, the composite panel can be caused to fail predictably at a selected negative failure load by appropriate choice of the selected distance "D". The positive failure load at which the same composite panel will fail can be rendered substantially equal to, greater than or less than the selected negative failure load by adjusting the length of the cut 66. In general, the positive failure load decreased curvilinearly as the length of the cut 66 is increased. It will be appreciated that the present invention provides a means by which a composite panel can be adapted to fail predictably over a wide range of selected applied loads, and further a means by which the positive and negative loads at which the panel will fail can be regulated.

Figure 16:
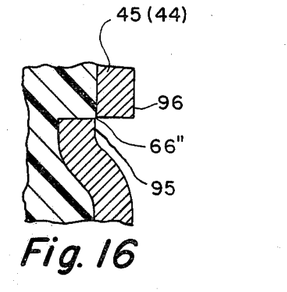
FIG. 16 is a cross-sectional view, similar to FIG. 15, illustrating a discontinuity produced by shearing.

The discontinuity 65 may also comprise a cut 66" (FIG. 16) such as formed by shearing the skin 45(44) wherein adjacent skin portions 95, 96 are laterally offset relative to each other. In the preferred arrangement, the skin portion 95 is substantially entirely laterally offset from the skin portion 96 thereby to preclude a bridging effect when the skin 45(44) is in compression.

Figure 17:
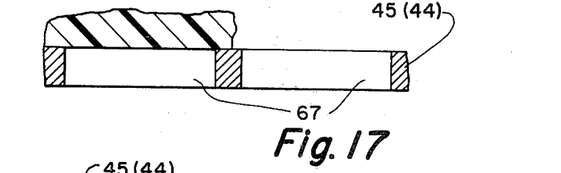
FIG. 17 is a fragmentary cross-sectional view taken along the line 17—17 of FIG. 14.

The discontinuity 65 may extend intermittently along the line 38 and comprise spaced slots 67 (FIGS. 14, 17) of identical lengths or of different lengths.

Figure 18:
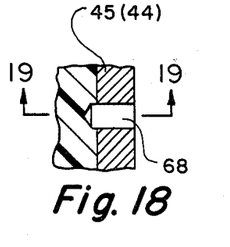
FIG. 18 is a fragmentary cross-sectional view taken along the line 18—18 of FIG. 14.
Figure 19:
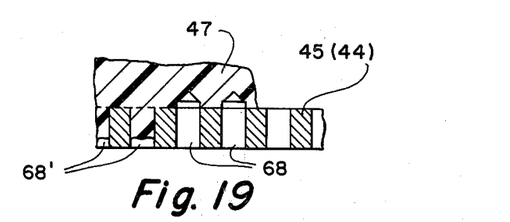
FIG. 19 is a fragmentary cross-sectional view, taken along the line 19—19 of FIG. 18.

The discontinuity 65 may also take the form of spaced perforations or openings 68 (FIGS. 14, 18, 19). Each of the perforations or openings 68 may be formed, for example, by drilling, after the panel 32 has been assembled. Alternatively, the skin 45(44) may be provided with openings or perforations 68' (FIG. 19) prior to assembling the panel 32. Where a structural core of foamed plastic materials 47 is provided, the foamed plastics material may extend into the perforations or openings 68'.

Figures 20, 21:
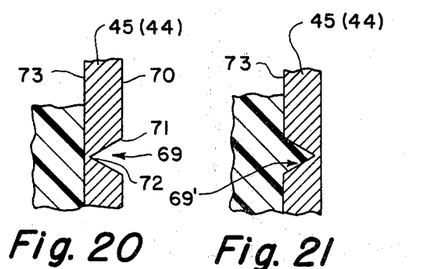
FIG. 20 is a cross-sectional view taken along the line 20—20 of FIG. 14.
FIG. 21 is a fragmentary cross-sectional view, similar to FIG. 20, wherein the groove is provided on an interior face of the skin.

The discontinuity 65 may also comprise a groove 69 (FIGS. 14, 20) formed in an exterior face 70 of the skin 45(44). The groove 69 presents an open end 71 in the plane of the exterior face 70 and a bottom 72 proximate to the interior face 73 of the skin 45(44). Alternatively, a groove 69' (FIG. 21) may be provided in the interior face 73 of the skin 45(44).

Figure 22:
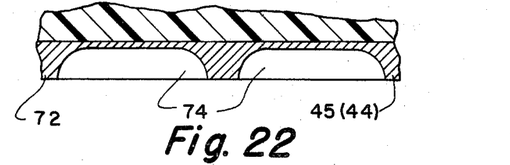
FIG. 22 is a fragmentary cross-sectional view, similar to FIG. 17, illustrating a discontinuity in the form of spaced grooves.

The discontinuity 65 may also take the form of spaced grooves 74 (FIGS. 14, 22). The spaced grooves may be provided in the exterior face 72 (FIG. 22) of the skin 45(44). Alternatively, the grooves may be provided on the interior face of the skin 45(44).

In composite panels wherein either or both of the skins 44, 45 are profiled, the discontinuity is formed at least in the crests. For example, in the composite panel 42' (FIG. 3) the discontinuity may be formed at least across the full width of each of the crests 75. If desired, the discontinuity may also be provided in the webs 77 and/or in the valleys 76.

SELECTED DISTANCE "D": A general relationship between the failure load of the present controlled release wall structure and the selected distance "D" is graphically presented in FIG. 23. For this discussion consider a wall structure assembled from plural composite panels, such as illustrated in FIG. 2, erected on a span of length L as in FIG. 5. Two modes of panel failure are possible. The panel may fail at mid-span (L/2) or at the discontinuity 65.

Panel failure at mid-span (L/2) is governed by the moment coefficient of the composite panel at mid-span. Thus, if only failure at mid-span is considered, the failure load is constant and is represented by the dotted line 78 in FIG. 23.

Panel failure at the discontinuity is governed by the moment coefficient of the composite panel at the discontinuity and by the selected distance "D". Thus, if only failure at the discontinuity is considered, the failure load decreased curvilinearly, for example, in the manner represented by the dotted line 79 in FIG. 23, as the selected distance "D" is increased. It will be observed from line 79 that as the selected distance approaches zero, the failure load approaches infinity. However, at a selected distance of L/n (n being greater than 2), the ultimate bending strength of the composite panel is exceeded and the failure load equals that represented by line 78. At a selected distance "D" of L/n, the composite panel may fail either at mid-span or at the discontinuity.

Figure 23:
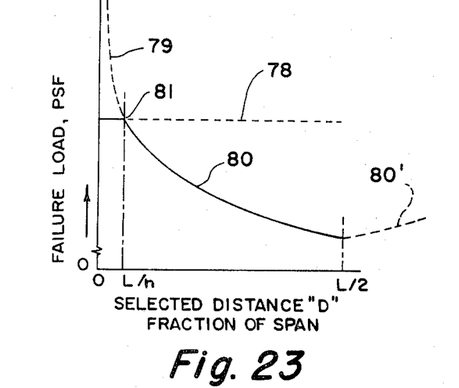
FIG. 23 is a graphical presentation of the general relationship between failure load of the present wall structure and the discontinuity spacing.

The failure load of the present controlled release wall structure as a function of the selected distance "D" is represented, in FIG. 23, by the solid line 80 which consists of segments of the lines 78 and 79. As the selected distance "D" is increased from zero to L/n, the failure load is constant. As the selected distance "D" is increased from L/n to L/2, the failure load decreases curvilinearly along the line 80. For selected distances "D" greater than L/2, the failure load increases along a line represented by the dotted line 80', the dotted line 80' being a mirror image of the solid line 80.

It will be appreciated that the span length also affects the failure load versus distance "D" relationship. In FIG. 23, the line 80 represents the failure load curve of a composite panel of span length L. For span lengths larger than L, the line 80 will assume positions below that in FIG. 23. Conversely, for span lengths less than L, the line 80 will assume positions above that in FIG. 23.

Since the bending strengths at mid-span and at the discontinuity of one composite panel configuration will differ from those of a different composite panel configuration, numerical values of the minimum and maximum selected distances "D" cannot be given. However, since the selected distance "D" also varies with the span length for each composite panel configuration, the selected distance "D", in general, may vary from about L/40 to about L/2.

Failure loads ranging from about 20 pounds per square foot to more than 150 pounds per square foot can be provided. In buildings where the principal concern is occupant safety against rapidly increasing pressures generated by explosions within the building, a failure load range of from 20 to 40 pounds per square foot is desired. In buildings where the structural framework is to be protected against stresses created by abnormally high wind pressure generated during tornadoes, hurricanes and the like, a failure load range of from 40 to 120 pounds per square foot appears to be adequate.

When a wall structure of the type illustrated in the drawings experiences abnormally high wind pressure corresponding to the selected failure load, the composite panel undergoes bending buckling and produces a dragging force which pulls the panel ends 34, 35 free of the confinement means. The resistance to release offered by the confinement means is insignificant compared to the magnitude of the aforesaid dragging force. Consequently, the failure load of the present controlled release wall structure is not affected by the confinement means.

In accordance with the present invention, a controlled release wall structure having a specified failure load requirement can be provided by (a) selecting, for a given span, the type of composite panel which will sustain the deflection and working stresses expected under normal wind load conditions; and (b) thereafter selecting the discontinuity spacing — the selected distance "D" — which will provide the specified failure load.

EXAMPLE: Two samples of a composite panel of the type illustrated in FIG. 2 were prepared and tested. Each of the composite panels was assembled from 22 gage (0.076 cm) inner and outer skins and a foamed-in-place polyurethane core having a core density of 3.48 pounds per cubic foot. The composite panels each had a length of 20.25 feet (6.17 meters) and had a covering width W (FIG. 14) of 29⅞ inches (75.9 cm). A discontinuity in the form of a cut ¼ inch (0.64 cm) wide and 29 inches (73.7 cm) long was provided in the inner skin at a distance of 25 inches (63.5 cm) from the end of the panel. Each composite panel was supported on three 5 inch (12.7 cm) wide beams at a center-to-center distance of 10.25 feet (3.57 meters). The opposite ends of the composite panel overlapped the end beams by 1 inch (2.54 cm) resulting in a selected distance of 24 inches (61 cm). The first composite panel failed at a positive loading of 72.1 pounds per square foot (352 kilograms per square meter). The second composite panel failed at a negative loading of 77.9 pounds per square foot (380 kilograms per square meter). The average failure load was 75 pounds per square foot (366 kilograms per square meter) resulting in a deviation of plus or minus 4%.

I claim:

1. In a controlled release wall structure, the combination comprising:

a building framework including a first frame member and spaced therefrom a second frame member;

a composite panel spanning the distance between the first and second frame members and having a panel end lapping said first frame member, said panel comprising an inner skin and an outer skin and a structural core disposed between and securing said inner skin to said outer skin in shear-transferring relation;

confinement means releasably retaining said panel end on said first frame member;

fastening means positively securing the said panel to said second frame member; and said composite panel having a discontinuity positioned between the first and second frame members and formed in at least one surface of one skin along a line extending generally parallel with and spaced at a selected distance from a proximate edge of said first frame member, said discontinuity reducing the bending strength of said composite panel whereby said wall structure is adapted to disengage from said confinement means at an applied load determined by said selected distance and to collapse in the direction of said applied load, but remain positively connected to said second frame member.

2. The wall structure of claim 1 wherein said one skin comprises said inner skin.

3. The wall structure of claim 1 wherein said one skin comprises said outer skin.

4. The wall structure of claim 1 wherein said discontinuity extends the full width of said one skin.

5. The wall structure of claim 1 wherein said discontinuity extends less than the full width of said one skin.

6. The wall structure of claim 1 wherein said discontinuity extends intermittently along said line.

7. The wall structure of claim 1 wherein said discontinuity comprises a cut extending along said line and entirely through said one skin.

8. The wall structure of claim 7 wherein said cut is formed by removing a narrow strip of said one skin.

9. The wall structure of claim 7 wherein said cut is formed by shearing said one skin such that one skin portion is substantially entirely offset relative to an adjacent skin portion.

10. The wall structure of claim 1 wherein said discontinuity comprises a series of cuts formed along said line and extending entirely through said one skin.

11. The wall structure of claim 1 wherein said discontinuity comprises a series of perforations formed along said line.

12. The wall structure of claim 1 wherein said discontinuity comprises a groove having an open end at said one surface and having a bottom adjacent to the opposite surface of said one skin.

13. The wall structure of claim 12 wherein said one surface comprises a hidden surface of said one skin.

14. The wall structure of claim 12 wherein said one surface comprises an exposed surface of said one skin.

15. The wall structure of Claim 14 wherein said groove extends substantially the full width of said one skin.

16. The wall structure of claim 14 wherein said groove extends intermittently along said line.

17. The wall structure of claim 1 wherein said structural core comprises a foamed plastic material.

18. The wall structure of claim 1 wherein said structural core comprises a honeycomb-like member.

19. In a controlled release wall structure, the combination comprising:

a building framework including a central frame member and first and second frame members on opposite sides of and spaced-apart from said central frame member;

a composite panel spanning continuously from said first frame member across said central frame member to said second frame member, said panel having a first panel end lapping said first frame member and having a second panel end lapping said second panel member, said panel comprising an inner skin and an outer skin and a structural core disposed between and securing said inner skin to said outer skin in shear-transferring relation;

first confinement means releasably retaining said first panel end on said first frame member;

second confinement means releasably retaining said second panel end on said second frame member;

fastening means positively securing said panel to said central frame member; and said composite panel having
- a first discontinuity positioned between the first and central frame members and formed in at least one face of one skin along a line extending generally parallel with and spaced at a first selected distance from a proximate edge of said first frame member, and
- a second discontinuity positioned between the second and central frame members and formed in at least one face of one skin along a line extending generally parallel with and spaced at a second selected distance from a proximate edge of said second frame member;

the first and second discontinuities reducing the bending strength of said composite panel whereby said wall structure is adapted to disengage from said confinement means at an applied load determined by one said selected distance and to collapse in the direction of the applied load, but remain positively connected to said central frame member.

20. The wall structure of claim 19
wherein the first and second frame members are equidistant from said central frame member; and
wherein the first and second selected distances are substantially identical.

21. The wall structure of claim 19
wherein the distance between the first and central frame members is less than the distance between the second and central frame members; and
wherein said first selected distance is greater than said second selected distance.

22. In a controlled release wall structure, the combination comprising:
a building framework including a central frame member and first and second frame members on opposite sides of and spaced-apart from said central frame member;
a first composite panel spanning the distance between said central frame member and the first member and having a first panel end lapping said central frame member;
a second composite panel spanning the distance between said central frame member and the second frame member and having a second panel end lapping said central frame member and positioned adjacent to said first panel end;
each said composite panel comprising an inner skin and an outer skin and a structural core disposed between and securing said inner skin to said outer skin in shear-transferring relation;
fastening means positively securing said first composite panel to said first frame member;
fastening means positively securing said second composite panel to said second frame member;
confinement means releasably retaining said first panel end and said second panel end to said central frame members;
said first composite panel having a discontinuity positioned between the first and central frame members and formed in at least one surface of one skin along a line extending generaly parallel with and spaced at a first selected distance from a first proximate edge of said central frame member;
said second composite panel having a second discontinuity positioned between the second and central frame members and formed in at least one face of one skin along a line extending generally parallel with and spaced at a second selected distance from a second proximate edge of said central frame member;
said first discontinuity and said second discontinuity reducing the bending strength of said first composite panel and of said second composite panel whereby those portions of said wall structure on opposite sides of said central frame member are each adapted to disengage from said confinement means at an applied load determined by the corresponding selected distance and to collapse in the direction of the applied load but remain positively connected to said first frame member and to said second frame member.

23. The wall structure of claim 22 wherein said first selected distance and said second selected distance are substantially identical.

24. The wall structure of claim 22 wherein separate confinement means releasably retain each of the first and second panel ends to said central frame member.

25. In a controlled release wall structure, the combination comprising:
a building framework including a first frame member and spaced therefrom a second frame member;
a composite panel spanning the distance between the first and second frame members and having a first panel end lapping said first frame member and a second panel end lapping said second frame member, said composite panel comprising an inner skin and an outer skin and a structural core disposed between and securing said inner skin to said outer skin in shear-transferring relation;
first confinement means releasably retaining said first panel end on said first frame member;
second confinement means releasably retaining sad second panel end on said second frame member; and
said composite panel having
- a discontinuity positioned between the first and second frame members and formed in at least one surface of one skin along a line extending generally parallel with and spaced at a selected distance from a proximate edge of one said frame member;

said discontinuity reducing the bending strength of said composite panel, whereby said wall structure is adapted to disengage from said confinement means at an applied load determined by said selected distance and to collapse in the direction of the applied load.

26. The wall structure of claim 25 including
a second discontinuity positioned between the first and second frame members and formed in at least one surface of one skin along a line extending generally parallel with and spaced at a selected distance from a proximate edge of the other said frame member; and
wherein said applied load is determined by one said selected distance.

27. The wall structure of claim 25 wherein the selected distances are substantially identical.

* * * * *